(12) United States Patent
Amurri et al.

(10) Patent No.: US 12,377,626 B2
(45) Date of Patent: Aug. 5, 2025

(54) PROCESS AND APPARATUS FOR BUILDING TYRES FOR VEHICLE WHEELS

(71) Applicant: PIRELLI TYRE S.P.A., Milan (IT)

(72) Inventors: Cesare Emanuele Amurri, Milan (IT); Christian De Col, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 200 days.

(21) Appl. No.: 18/317,844

(22) Filed: May 15, 2023

(65) Prior Publication Data

US 2023/0286236 A1    Sep. 14, 2023

Related U.S. Application Data

(63) Continuation of application No. 16/771,206, filed as application No. PCT/IB2018/060352 on Dec. 19, 2018, now Pat. No. 11,691,370.

(30) Foreign Application Priority Data

Dec. 20, 2017   (IT) .......................... 102017000147539

(51) Int. Cl.
*B29D 30/60* (2006.01)
*B29D 30/16* (2006.01)
(Continued)

(52) U.S. Cl.
CPC ......... *B29D 30/60* (2013.01); *B29D 30/1621* (2013.01); *B29D 30/3021* (2013.01);
(Continued)

(58) Field of Classification Search
CPC .......................... B29D 30/14; B29D 30/1621; B29D 30/1628; B29D 30/28; B29D 30/3021;
(Continued)

(56) References Cited

U.S. PATENT DOCUMENTS 6,554,041 B1 * 4/2003 Ohki ....................... B29C 48/08
156/425
6,576,077 B1 * 6/2003 Mitsuhashi ............. B29C 48/35
156/130.7
(Continued)

FOREIGN PATENT DOCUMENTS

EP       881060 A2 * 12/1998    ............. B29D 30/52

OTHER PUBLICATIONS

(U.S. Appl. No. 18/317,844) 1.98(d) Certification Statement + List. Date of Apr. 22, 2025. 1 page.

*Primary Examiner* — Sedef E Paquette
(74) *Attorney, Agent, or Firm* — Steinfl + Bruno LLP (57) ABSTRACT

An application device for applying a conductive insert on a tyre being processed. The application device includes a supply device for supplying a conductive liquid elastomeric compound, and an applicator having a movable surface for being operatively coupled with the supply device and receiving the conductive liquid elastomeric compound. The movable surface is for being placed in contact with a rotating tyre being processed and for applying the conductive liquid elastomeric compound on at least one coil of axially adjacent and/or partially superimposed coils. The applicator generates depressions in the tyre in a pattern defined by elements in relief and fills the depressions in the tyre with the conductive liquid elastomeric compound to covering the elements as the depressions in the tyre are generated.

20 Claims, 8 Drawing Sheets

(51) Int. Cl.
  *B29D 30/30*   (2006.01)
  *B29D 30/14*   (2006.01)
  *B29D 30/28*   (2006.01)
  *B29D 30/52*   (2006.01)
  *B60C 19/08*   (2006.01)

(52) U.S. Cl.
  CPC .......... *B29D 30/14* (2013.01); *B29D 30/1628* (2013.01); *B29D 30/28* (2013.01); *B29D 30/3028* (2013.01); *B29D 2030/526* (2013.01); *B60C 19/08* (2013.01)

(58) Field of Classification Search
  CPC .... B29D 30/3028; B29D 30/60; B29D 30/68; B29D 2030/0612; B29D 2030/526; B29D 2030/685; B60C 19/08; B29K 2995/0005
  USPC ........................................ 152/152.1; 156/130
  See application file for complete search history.

(56) References Cited

U.S. PATENT DOCUMENTS

| | | |
|---|---|---|
| 11,691,370 B2 | 7/2023 | Amurri et al. |
| 2009/0229738 A1* | 9/2009 | Lo Presti .......... B29D 30/3028 156/397 |
| 2020/0368983 A1 | 11/2020 | Amurri et al. |

* cited by examiner

PROCESS AND APPARATUS FOR BUILDING TYRES FOR VEHICLE WHEELS

CROSS-REFERENCE TO RELATED APPLICATIONS

The present application is the continuation Application of U.S. Non-Provisional application Ser. No. 16/771,206, filed on Jun. 9, 2020, which is the U.S. National Stage of International Patent Application No. PCT/IB2018/060352, filed on Dec. 19, 2018, which, in turn, claims priority to Italian Patent Application No. IT 102017000147539, filed on Dec. 20, 2017, all of which are incorporated herein by reference in their entirety.

TECHNICAL FIELD OF THE INVENTION

The present invention relates to a process and an apparatus for building tyres for vehicle wheels.

A tyre for vehicle wheels generally comprises a carcass structure comprising at least one carcass ply having end flaps engaged with respective annular anchoring structures. A belt structure is associated in a radially outer position to the carcass structure, comprising one or more belt layers, arranged in radial superposition with respect to each other and with respect to the carcass ply, having textile or metallic reinforcing cords with crossed orientation and/or substantially parallel to the circumferential development direction of the tyre. A tread band is applied in a position radially outer to the belt structure, also made of elastomeric material like other semi-finished products making up the tyre. The assembly of at least said belt structure and said tread band form the crown structure of the tyre. Respective sidewalls of elastomeric material are further applied on the lateral surfaces of the carcass structure, each extending from one of the lateral edges of the tread band up at the respective annular anchoring structure to the beads. In "tubeless" tyres, the carcass ply is internally coated by a preferably butyl-based layer of elastomeric material, usually called "liner" having optimal airtight characteristics and extending from one to the other of the beads.

The production cycles of a tyre provide for a building process in which the various structural components of the tyre itself are made and/or assembled on one or more drums. The built green tyres are transferred to a moulding and vulcanisation line where a moulding and vulcanisation process is carried out to define the structure of the tyre according to a desired geometry and tread pattern.

Definitions

The terms "elastomeric material" or "elastomeric compound" are used to designate a composition comprising at least one elastomeric polymer and at least one reinforcement filler. Preferably, such composition further comprises additives such as, for example, a cross-linking agent and/or a plasticiser. Due to the presence of the cross-linking agent, such material can be cross-linked by heating, so as to form the final manufactured article.

By "component" or "structural component" of a tyre it is meant any portion thereof capable of performing a specific function or a part thereof. For example, tyre components are liner, underliner, sidewall inserts, bead cores, filler inserts, anti-abrasive, sidewalls, carcass ply/plies, belt layer(s), tread band, tread band underlayer, under-belt inserts etc., or a part thereof.

By "tyre being processed" it is meant at least one component or structural component of the tyre deposited on a drum.

The terms "radial" and "axial" and the expressions "radially inner/outer" and "axially inner/outer" are used referring to a direction perpendicular and a direction parallel to a rotation axis of the tyre being processed, respectively.

The terms "circumferential" and "circumferentially" are instead used with reference to the annular development direction of the tyre being processed.

By "plane of symmetry of the tyre being processed" it is meant the plane of symmetry orthogonal to the rotation axis of the tyre being processed.

By "conductive liquid elastomeric compound" it is meant an elastomeric compound which at room temperature (20° C.) is liquid or substantially liquid and which has a low electrical resistivity, comparable to that of conductive elastomeric compounds such as those containing carbon black.

The conductive liquid elastomeric compound cross-links together with the other components of the tyre when the latter is subjected to vulcanisation.

Prior Art

Document EP1857262 illustrates a method for producing a tyre by applying a strip of raw elastomeric material provided with a conductive material to a carcass by spiral winding of the strip onto the carcass itself. The conductive material allows dissipating the electrostatic charge through the tyres, in particular through the tyres with tread containing a high percentage of silica which imparts a good handling but a high electrical resistance. A conductive powder, such as graphite or carbon black, possibly suspended in oil, is applied to the strip before winding on the carcass, for example by spraying, immersion or electrostatically. EP1857262 further discloses that the strip is made to pass through a reservoir containing the aforementioned powders and is then wound onto the carcass.

SUMMARY

In the context of tyre building processes which provide for making the raw tread band by winding a continuous elongated element made of elastomeric material in axially adjacent or partially superimposed coils on a tyre being processed, the Applicant has felt the need to improve the known technical solutions, such as that illustrated in EP1857262, which allow the electrostatic charge to be dissipated through the tyres themselves.

The Applicant has in fact observed that the deposition of conductive powders on the entire outer surface of the strip of elastomeric material intended to form the tread band, as illustrated in EP1857262, entails:

difficulty in controlling the amount of electrical conductance required by the tyre;

the application of powders even on areas of the tyre on which it would not be necessary, or that do not contribute to the required conductive effect;

influence on the performance of the tyre related in particular to the tread band (such as road grip and handling);

electrical continuity interrupted at intervals between the radially outer surface of the tread band and the radially outer layer of the belt structure (typically the zero degree layer) due to small surface movements of the elastomeric compound during moulding and vulcanisation which can cause the small layer of powder to sink within the compound itself;

disadvantages during the coiling of the tread band, since the oil and/or conductive powders influence the mutual adhesion of adjacent coils.

In particular, the Applicant has perceived the need to propose a process for building tyres in which the implementation of elements and/or materials capable of dissipating the electrostatic charge through the tyre:

interferes in a marginal and negligible way with the other steps of the process, in order, for example, to ensure a high productive efficiency;

does not substantially affect the other features of the produced tyre, in particular its performance, in terms, for example, of road grip and handling even during wear thereof.

The Applicant has found that the necessary electrical conductance/resistance of the tyre can be obtained by means of electrically conductive paths which connect points or limited areas of a radially outer surface of the tread band with the belt structure and that such conductive paths can be obtained through the deposition of a conductive liquid elastomeric compound directly on the tyre being processed and during the formation of the spiraled tread band.

According to a first aspect thereof, the present invention relates to a process for building tyres for vehicle wheels.

Preferably, it is provided to form a tyre being processed comprising a belt structure.

Preferably, it is provided to deposit a tread band in radially outer position with respect to said belt structure by winding a continuous elongated element made of elastomeric material according to coils that are axially adjacent and/or partially superimposed.

Preferably, it is provided to apply, during the deposition of the tread band and on at least one of said coils already wound in a position radially external to said belt structure, a conductive liquid elastomeric compound.

Preferably, said conductive liquid elastomeric compound continuously extends between a radially outer surface of the tread band and a radially outer surface of the belt structure so as to generate a plurality of electrically conductive paths connecting the radially outer surface of the tread band with the radially outer surface of said belt structure and free zones adapted to directly adhere with a successive axially adjacent coil.

According to a second aspect thereof, the present invention relates to an apparatus for building tyres for vehicle wheels.

Preferably, a motorized forming drum is provided, configured for supporting and rotating a tyre being processed around a rotation axis thereof.

Preferably, a deposition device is provided, configured for winding a continuous elongated element made of elastomeric material according to coils that are axially adjacent and/or partially superimposed in radially outer position on a belt structure of the tyre being processed.

Preferably, an application device configured for applying a conductive insert is provided.

Preferably, said application device comprises:

a supply device for supplying a conductive liquid elastomeric compound;

an applicator having a movable surface configured for being operatively coupled with the supply device and receiving the conductive liquid elastomeric compound; wherein the movable surface is configured for being placed in contact with the tyre being processed placed in rotation and for applying the conductive liquid elastomeric compound on at least one coil of said coils that are axially adjacent or partially superimposed.

According to a third aspect, the present invention relates to an application device configured for applying a conductive insert to a tyre being processed.

Preferably, a supply device is provided for supplying a conductive liquid elastomeric compound.

Preferably, an applicator is provided having a movable surface configured for operatively coupling with the supply device and receive the conductive liquid elastomeric compound.

Preferably, the movable surface is configured for being placed in contact with a tyre being processed placed in rotation and for applying the conductive liquid elastomeric compound on at least one coil of a plurality of coils that are axially adjacent and/or partially superimposed, defining a tread band of the tyre being processed.

According to a further aspect thereof, the present invention relates to a method for applying a conductive insert to a tyre being processed, wherein a tread band of the tyre being processed is formed by winding a continuous elongated material of elastomeric material according to axially adjacent and/or partially superimposed coils on a belt structure.

Preferably, said method comprises: applying, during the deposition of the tread band and on at least one of said coils already wound around the belt structure, a conductive liquid elastomeric compound continuously extended between a radially outer surface of the tread band and the belt structure so as to generate a plurality of electrically conductive paths connecting said radially outer surface with said belt structure and free zones adapted to directly adhere with a successive axially adjacent coil.

The Applicant believes that the present invention allows:

making tyres provided with conductive inserts capable of dissipating the electrostatic charge without substantially to affecting the other features and/or performance of the same tyres during their entire service life;

obtaining the formation of conductive inserts without compromising the formation of the other components of the tyre and in particular of the spiral tread band;

controlling the amount of electrical conductance by calibrating the amount of deposited conductive liquid elastomeric compound;

calibrating and precisely positioning the deposited amount of conductive elastomeric compound to avoid excess material which can lead to leakage in the subsequent handling steps during the building and vulcanisation;

containing the costs related to the material, the devices and the formation processes of the conductive inserts and therefore also the overall production costs of the tyres.

The present invention, in at least one of the above aspects thereof, can exhibit one or more of the following preferred features.

Preferably, the radially outer surface of the tread band on which the conductive liquid elastomeric compound is present is located in a footprint area of the tyre, so that static electricity is discharged to the ground.

Preferably, the coils have mutually coupled circumferential surfaces.

Preferably, the circumferential surfaces are inclined relative to a surface of the belt structure.

Preferably, the circumferential surfaces delimit an angle of about 30° to about 90° with the surface of the belt structure.

Preferably, the circumferential surfaces are inclined with respect to a plane of symmetry of the tyre being processed.

Preferably, the circumferential surfaces delimit a complementary angle (of a right angle) of between about 0° and about 60° with a plane of symmetry of the tyre being processed.

Preferably, it is provided to apply the conductive liquid elastomeric compound on a visible circumferential surface of the coil just wound.

Preferably, the visible circumferential surface radially extends between the radially outer surface of the tread band and the belt structure.

Preferably, the conductive liquid elastomeric compound is applied on areas of the radially outer surface of the tread band and of the belt structure adjacent to said visible circumferential surface of the coil.

The circumferential surface is visible as it belongs to the just deposited coil before a successive coil is wound (which covers such a circumferential surface).

The conductive liquid elastomeric compound extends over the entire width of the circumferential surface and also on areas of the radially outer surface of the tread band and of the belt structure immediately adjacent the circumferential surface.

Preferably, the conductive liquid elastomeric compound is applied according to a plurality of discrete portions which follow each other along a circumferential extension of the tread band.

Preferably, the conductive liquid elastomeric compound is applied according to an undulated continuous path that is extended along a circumferential extension of the tread band.

In other words, the pattern or design according to which the conductive liquid elastomeric compound is deposited is such that: along axial directions this pattern continuously connects the radially outer surface of the tread band and the belt structure passing over the circumferential surface of the coil; along a circumferential direction, there are instead areas of the circumferential surface covered by the conductive liquid elastomeric compound and areas without said conductive liquid elastomeric compound. The areas without the conductive liquid elastomeric compound allow the subsequently deposited coil to adhere firmly to the already deposited coil providing continuity to the tread band. The areas without the conductive liquid elastomeric compound allow joining between the coil on which the conductive liquid elastomeric compound is applied and the subsequently deposited coil.

Preferably, each of the areas without the conductive liquid elastomeric compound has a circumferential extension between a few millimetres and a few centimetres, preferably between about 5 mm and about 5 cm.

Preferably, depositing the tread band comprises: temporarily interrupting the winding of the continuous elongated element; applying, on the last wound coil, the conductive liquid elastomeric compound; restarting the winding of the continuous elongated element.

In this case, the deposition of the tread band occurs in two steps. When a first step is completed, in which about one axial half of the tread band is deposited, the conductive elastomeric compound is applied and then, in a second step, a second axial half of the tread band is deposited. Preferably, depositing the tread band comprises: applying the conductive liquid elastomeric compound simultaneously with the winding of the continuous elongated element.

Preferably, it is provided to deposit the continuous elongated element at a first point along the circumferential development of the tyre being processed and to apply the conductive liquid elastomeric compound to a second point different from the first point along said circumferential development.

Preferably, the first point and the second point are positioned at diametrically opposed areas of the tyre being processed.

The simultaneous application allows limiting the formation times of the tread band (which remain the same with and without deposition of the conductive insert) and to ensure the continuity of the continuous elongated element in deposition.

Preferably, applying the conductive liquid elastomeric compound comprises: generating depressions in the tyre being processed and filling them with said conductive liquid elastomeric compound.

The elastomeric material not yet vulcanised of the tyre being processed (in particular the continuous elongated element) is deformable. The formation of depressions in said elastomeric material allows imparting a certain thickness to the conductive liquid elastomeric compound which fills them.

Preferably, the conductive liquid elastomeric compound comprises at least one process oil, natural and/or synthetic rubber and conductive particles.

Preferably, the applicator comprises a wheel rotatable around a centre thereof, wherein the movable surface is the radially peripheral surface of said wheel.

Preferably, the supply device comprises an auxiliary wheel rotatable about a centre thereof and having a peripheral edge placed in contact with the movable surface, more preferably with the radially peripheral surface of the applicator wheel.

Preferably, the supply device comprises a tank for the conductive liquid elastomeric compound; wherein the peripheral edge of the auxiliary wheel is partially in contact with the conductive liquid elastomeric compound contained in the tank.

The auxiliary wheel plunges into the conductive liquid elastomeric compound contained in the tank, collects it, and transfers it to the movable surface of the applicator which in turn deposits it on the tyre being processed. The auxiliary wheel doses a controlled amount of conductive liquid elastomeric compound to the applicator.

Preferably, a rotation axis of the wheel is parallel to a rotation axis of the auxiliary wheel.

Preferably, the application device comprises a support frame.

Preferably, the applicator is mounted on the support frame.

Preferably, the wheel is mounted idly on the support frame.

Preferably, the supply device is mounted on the support frame.

Preferably, the auxiliary wheel is mounted idly on the support frame.

Preferably, while the tyre rotates, it drives the wheel in rotation which in turn drives the auxiliary wheel in rotation.

Preferably, at least one of the wheel and the auxiliary wheel is motorised.

Preferably, the wheel and the auxiliary wheel are operatively connected by a transmission, for example by a pair of gears. This solution allows keeping the partially immersed auxiliary wheel always in rotation and keeps the applicator wheel always covered with conductive liquid elastomeric compound (even when the wheel is not in contact with the tyre being processed). In this way, the deposition of the conductive liquid elastomeric compound on the tyre being processed begins as soon as said tyre being processed and said applicator come into mutual contact.

Preferably, the application device comprises at least one operating spring (or alternatively a pneumatic cylinder or other) between the wheel and the auxiliary wheel for retaining the peripheral edge against the movable surface.

Preferably, the support frame comprises a main frame and an auxiliary frame.

Preferably, the main frame carries the applicator.

Preferably the main frame carries the wheel.

Preferably, the auxiliary frame carries the auxiliary wheel.

Preferably, the auxiliary frame is pivoted on the main frame.

Preferably, said at least one spring is connected to the main frame and to the auxiliary frame. This solution allows the wheel and the auxiliary wheel to be kept in mutual contact even when their dimensions vary.

Preferably, the tank is carried by the main frame.

Preferably, the support frame comprises a base and the main frame is mounted on the base.

Preferably, the main frame is movable with respect to the base.

Preferably, an actuator, e.g. a pneumatic cylinder, is operatively interposed between the base and the main frame for moving said main frame.

Preferably, a control unit is connected to the actuator and is configured for regulating a thrust of the applicator on the tyre being processed during the application of the conductive liquid elastomeric compound.

Preferably, the applicator comprises a quick release mechanism operatively coupled to the wheel and to the support frame, preferably to the main frame, for releasing or hooking the wheel from/to said support frame.

Preferably, the quick release mechanism comprises a pin, wherein the wheel is rotatably mounted on said pin, and a hook for locking the pin in a seat of the frame.

Preferably, the supply device comprises an auxiliary quick release mechanism operatively coupled to the auxiliary wheel and to the auxiliary frame, for releasing or hooking the auxiliary wheel from/to said auxiliary frame.

Preferably, the auxiliary frame comprises an auxiliary pin, wherein the auxiliary wheel is rotatably mounted on said auxiliary pin, and a hook for locking the auxiliary pin in a seat of the auxiliary frame.

Preferably, the supply device comprises a recirculation circuit operatively coupled to the tank.

The recirculation circuit serves for keeping the conductive liquid elastomeric compound moving in order to make it homogeneous and avoid stagnation.

Preferably, the recirculation circuit comprises an external tank containing the tank (which is therefore more internal).

Preferably, the recirculation circuit comprises recirculation pipes and a pump operationally active on said pipes.

Preferably, the recirculation circuit comprises a reservoir for containing the conductive liquid elastomeric compound. The innermost tank receives the conductive liquid elastomeric compound from the reservoir.

Preferably, the innermost tank has a spillway mouth from which the excess conductive liquid elastomeric compound outflows.

Preferably, in a lower portion of the external tank, there is a drain connected to the reservoir through the pipes. The excess conductive liquid elastomeric compound returns to the reservoir through said drain.

Preferably, the supply device comprises at least one scraper operatively active on the peripheral edge of the auxiliary wheel in order to eliminate excess quantities of the conductive liquid elastomeric compound.

Said at least one scraper allows controlling the thickness of the conductive liquid elastomeric compound film deposited on the peripheral edge and therefore on the tyre being processed.

Preferably, a distance controller, preferably micrometric, operatively associated with the scraper allows adjusting a distance between said scraper and the peripheral edge, so as to transfer to the auxiliary wheel the necessary minimum amount of conductive liquid elastomeric compound.

Preferably, the movable surface has a design defined by elements in relief and/or by recesses.

Such a design corresponds to the pattern or design according to which the liquid elastomeric compound is deposited on the tyre being processed. Such a pattern or design is therefore defined by the geometry of the movable surface.

Preferably, the movable surface has a plurality of teeth.

The teeth generate the plurality of discrete portions that follow each other along the circumferential development of the tread band.

Preferably, the teeth extend along a predominantly axial direction.

Preferably, the teeth are inclined with respect to an axial direction.

Preferably, each of the teeth has a notch, preferably axial, which divides them into two halves.

Preferably, the movable surface has a corrugated relief. The corrugated relief generates the continuous corrugated path of the conductive liquid elastomeric compound on the tyre being processed.

Preferably, the relief has a constant radial thickness.

Preferably, the relief has a substantially sinusoidal shape or is shaped like a fret.

Preferably, the relief has a central recess.

Preferably, the movable surface has an axial width greater than a width of a visible circumferential surface of the coils.

In this way, the conductive liquid elastomeric compound is applied both on the circumferential surface of the coil and on the areas of the radially outer surface of the tread band and the belt structure immediately adjacent to the circumferential surface of the coil.

Preferably, the movable surface is more rigid than the tyre being processed.

In this way, the movable surface with the relief elements and/or recesses is capable of leaving footprints and generating the aforementioned depressions in the tyre being processed.

Preferably, the peripheral edge of the auxiliary wheel is as rigid as the movable surface.

Preferably, the peripheral edge of the auxiliary wheel is more yielding than the movable surface.

Preferably, the peripheral edge is made of metal.

Preferably, the peripheral edge is made of a flexible and absorbent material.

The material of the peripheral edge of the auxiliary wheel is selected according to the amount of liquid elastomeric compound to be transferred.

Preferably, a motorised support carries the forming drum.

Preferably, devices are provided for orienting the tyre being processed with respect to the movable surface, in a manner so as to arrange a visible circumferential surface of the coil parallel to the movable surface.

Preferably, the devices for orienting the tyre are integrated into or comprise the motorised support.

Preferably, the devices for orienting the tyre comprise a robotic arm, preferably anthropomorphic with at least six axes.

Preferably, the forming drum carries at least one component or structural component of the tyre.

Further features and advantages will become more apparent from the detailed description of a preferred but non-exclusive embodiment of an apparatus and a process for building tyres for vehicle wheels according to the present invention.

DESCRIPTION OF THE DRAWINGS

Such description is given hereinafter with reference to the accompanying drawings, provided only for illustrative and, therefore, non-limiting purposes, in which.

DETAILED DESCRIPTION

Figure 1:
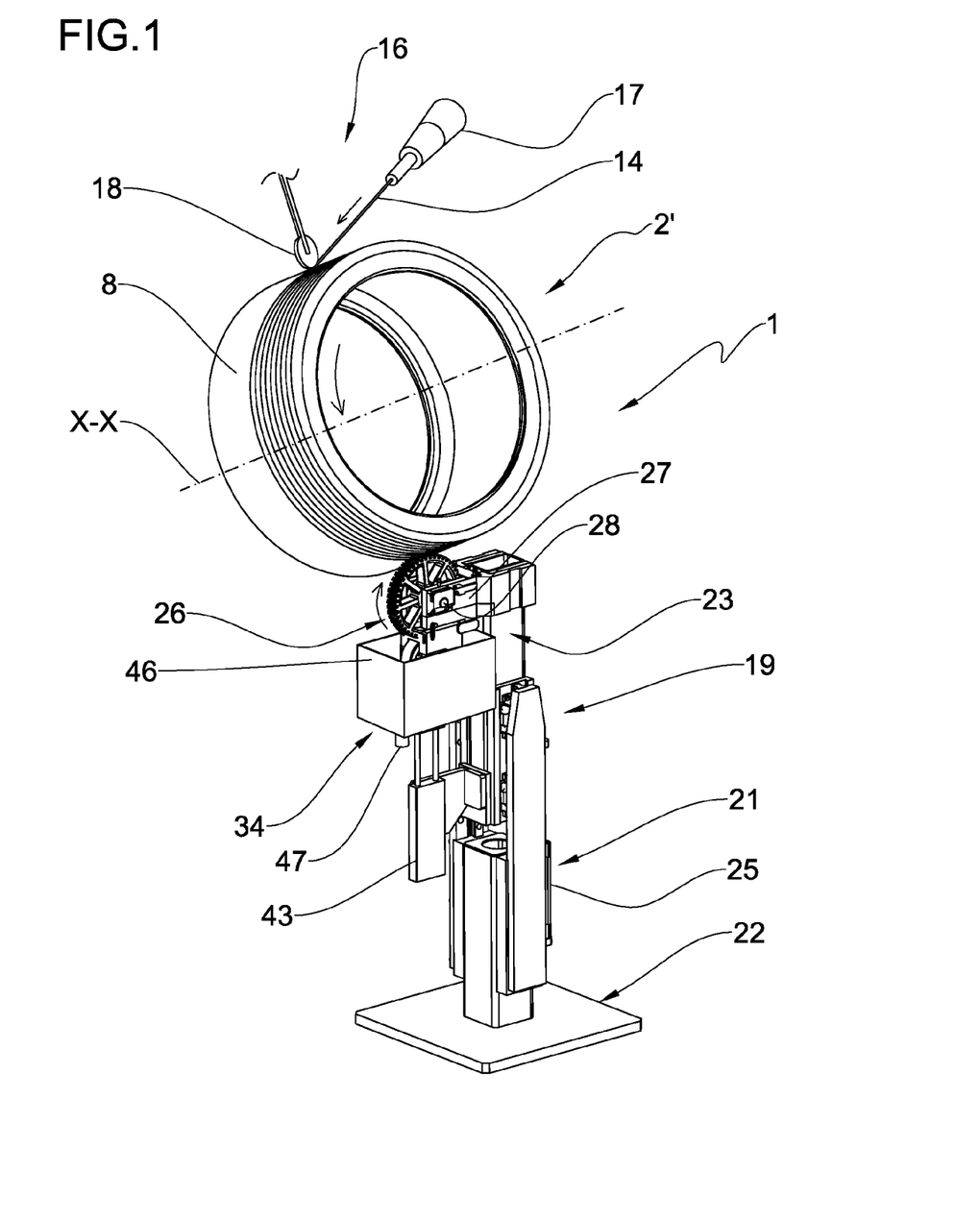
FIG. 1 is a perspective view of some elements of a station of an apparatus for building tyres according to the present invention.

With reference to FIG. 1, reference numeral 1 indicates as a whole a station of an apparatus for building green tyres. The apparatus is in turn part of a plant, not shown as a whole, for building tyres for vehicle wheels.

Figure 9:
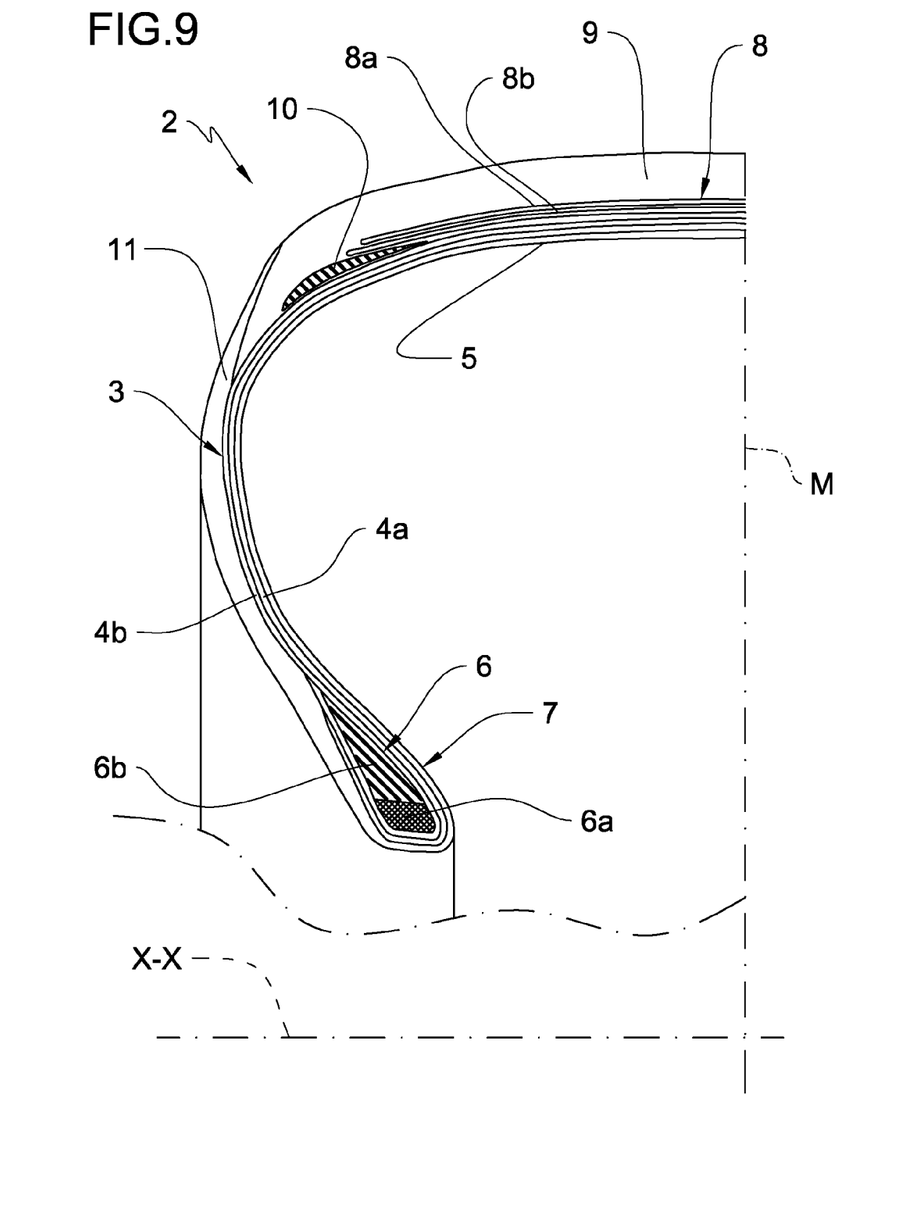
FIG. 9 is a radial half-section of a tyre built in the apparatus in FIG. 1.

A tyre 2, built in said plant, is shown in FIG. 9 and essentially comprises a carcass structure 3 having one/two carcass plies 4a/4a, 4b. An airtight layer of elastomeric material or so-called liner 5 is applied internally to the carcass ply/plies 4a/4a, 4b. Two annular anchoring structures 6 comprising each a so-called bead core 6a bearing an elastomeric filler 6b in radially outer position are engaged to respective end flaps of the carcass ply or plies 4a/4a, 4b. The annular anchoring structures 6 are integrated in the proximity of zones usually identified by the name of "beads" 7, at which the engagement between tyre 2 and a respective mounting rim usually occurs. A belt structure 8 comprising for example belt layers 8a, 8b is circumferentially applied around the carcass ply/plies 4a/4a, 4b, and a tread band 9 is circumferentially overlapped to the belt structure 8. The belt structure 8 can be associated with so-called "under-belt inserts" 10 placed each between the carcass ply/plies 4a/4a, 4b and one of the axially opposite end edges of the belt structure 8. Two sidewalls 11, extending each from the respective bead 7 to a corresponding lateral edge of the tread band 9, are applied in laterally opposite positions on the carcass ply/plies 4a/4a, 4b. The portion of each sidewall 11 next to the lateral edge of the tread band 9 is known as the shoulder of the tyre. The tyre 2 has a symmetry plane "M" (FIG. 9) equidistant from the respective beads 7 and perpendicular to its rotation axis "X-X", when the tyre is in service.

The plant, not shown, comprises a production line of tyres 2 consisting of the apparatus for building green tyres and at least one moulding and vulcanisation unit operatively arranged downstream of the building apparatus.

In a preferred but not exclusive embodiment, the apparatus for building green tyres comprises a carcass building line at which forming drums are moved between different stations arranged to form, on each forming drum, the carcass structure 3 comprising for example the carcass plies 4a, 4b, the liner 5, the annular anchoring structures 6 and possibly at least a part of the sidewalls 11. At the same time, in a crown building line, one or more forming drums 12 are sequentially moved between different work stations arranged to form on each forming drum 12 a crown structure, comprising at least the belt structure 8, the tread band 9, and possibly at least a part of the sidewalls 11. In an assembly station, the crown structure is coupled to the carcass structure 3.

The station 1 of the apparatus illustrated in FIG. 1 comprises a motorized forming drum configured for supporting and rotating a tyre 2' being processed around a rotation axis "X-X" thereof. As shown schematically in FIG. 2, the forming drum 12 is carried and supported at one end of a robotic arm 13 (shown only partially), preferably anthropomorphic with at least six axes. On the end of the robotic arm 13, there is a motorized support which carries the forming drum 12 and is configured for rotating it around the rotation axis "X-X" thereof. The robotic arm 13 is also configured for orienting the forming drum 12 and therefore also the tyre 2' being processed arranged on the drum 12 itself.

The tyre 2' being processed shown in FIGS. 1 to 6, 8 and 9 comprises the belt structure 8 on which the tread band 9 is deposited by winding a continuous elongated element 14 made of elastomeric material according to coils 15 axially adjacent and/or partially overlapped.

The apparatus then comprises a deposition device 16 configured for winding the continuous elongated element 14 made of elastomeric material according to the coils 16 that are axially adjacent and/or partially superimposed (better visible in FIGS. 2 and 4) in radially outer position on the belt structure 8 of the tyre being processed 2'. The deposition device 16 comprises an extruder 17 (partially shown in FIG. 1) configured for delivering the continuous elongated element 14 of elastomeric material on the belt structure 8 and a deposition wheel 18, or other pressure element, configured for pressing and adhering the continuous elongated element 14 to the belt structure 8 while the tyre being processed 2' rotates around the rotation axis "X-X". In the illustrated embodiment, the deposition device 16 is located above the forming drum 12 and the tyre being processed 2'.

The apparatus further comprises an application device 19 configured for applying a conductive insert. Electrically conductive paths 20 defining the conductive insert are visible in FIG. 5 and in FIG. 8.

The application device 19 comprises a support frame 21 provided with a base 22, a main frame 23 mounted on the base 22, and an auxiliary frame 24. The base 22 comprises a platform configured for being resting on the ground and on which a column is mounted with a pair of uprights which extend vertically from the platform. Between the uprights is the main frame 23 which also has a vertically elongated shape. Guides, not shown in detail, are operatively interposed between the main frame 23 and the uprights of the base 22 to allow the vertical sliding of the main frame 23 with respect to the base 22. An actuator 25, e.g. a pneumatic cylinder, is operatively interposed between the base 22 and the main frame 23 for moving the main frame 23 on the guides.

The main frame 23 carries, at an upper end thereof which projects beyond the uprights, an applicator defined by a wheel 26 rotatable about a centre thereof. The wheel 26 is mounted idly on a pair of plates 27 of the support frame 21. In particular, the plates 27 are mutually parallel and spaced apart. The wheel 26 is located between the plates 27 and is rotatably mounted on a pin 28 which is in turn inserted into openings in the plates 27. When the base 22 is resting on the ground, the pin 28 lies substantially horizontal and the wheel 26 rotates about a horizontal rotation axis. A hook 29 is mounted on one of the plates 27 and is configured for engaging one end of the pin 28 projecting beyond the same plate 27. In particular, the hook 29 is movable in rotation between a position of engagement with the end of the pin 28 and a position of disengagement from the end of the pin 28. When the hook 29 is in the engaged position, the pin 28 is axially anchored to the plates 27. When the hook 29 is in the disengaged position, the pin 28 can be removed from the plates 27 to remove and possibly replace the wheel 26. The pin 28 with the hook 29 constitute a quick release mechanism operatively coupled to the wheel 26 and to the support frame 21 for releasing or hooking the wheel to/from said support frame 21.

A radially peripheral surface of the wheel 26 defines a movable surface 30 configured for being contacted with the tyre 2' being processed placed in rotation. The movable surface has a design defined by elements in relief and/or by recesses.

Figure 6:
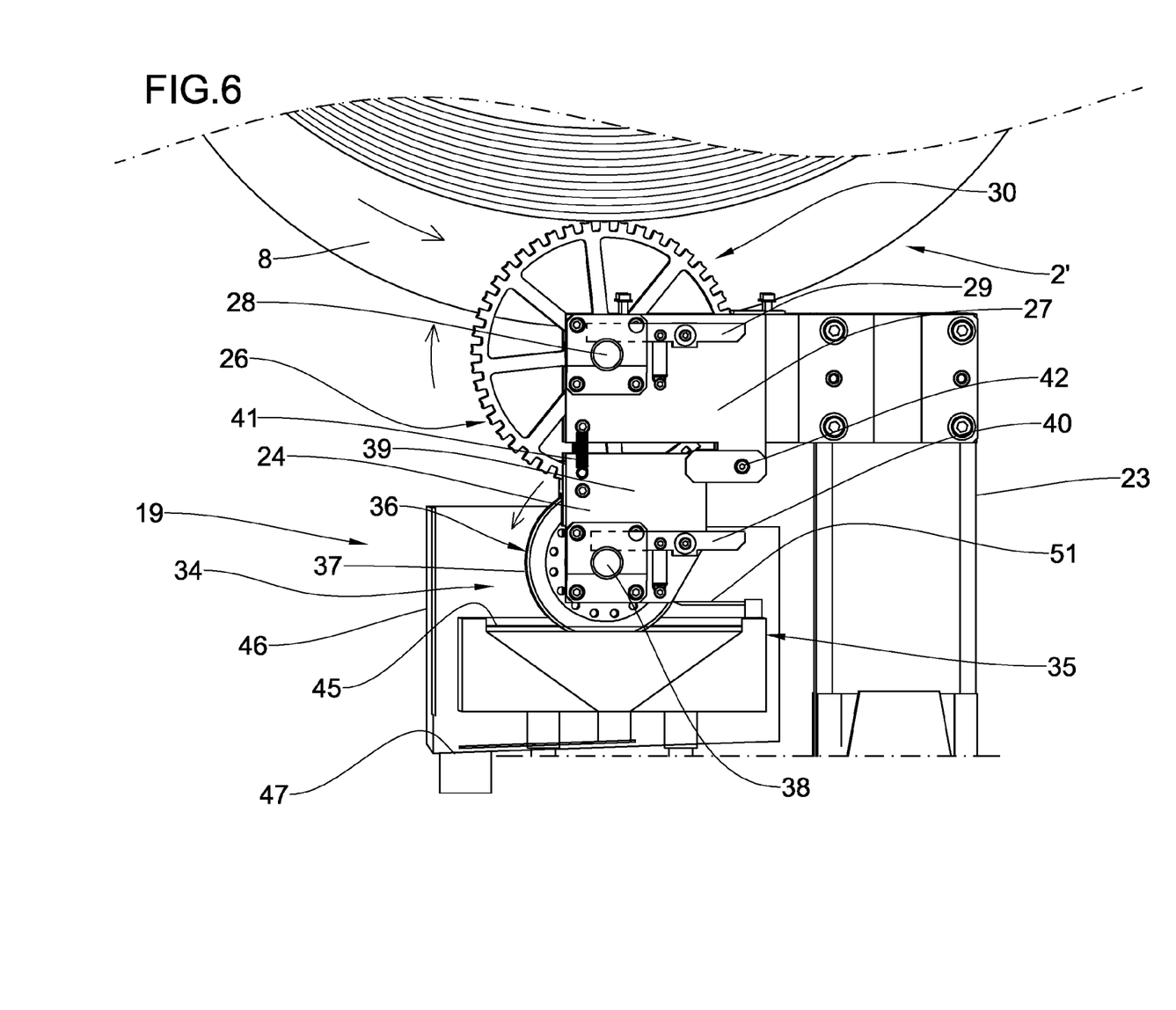
FIG. 6 shows a lateral view of the portion in FIG. 4.
Figure 7:
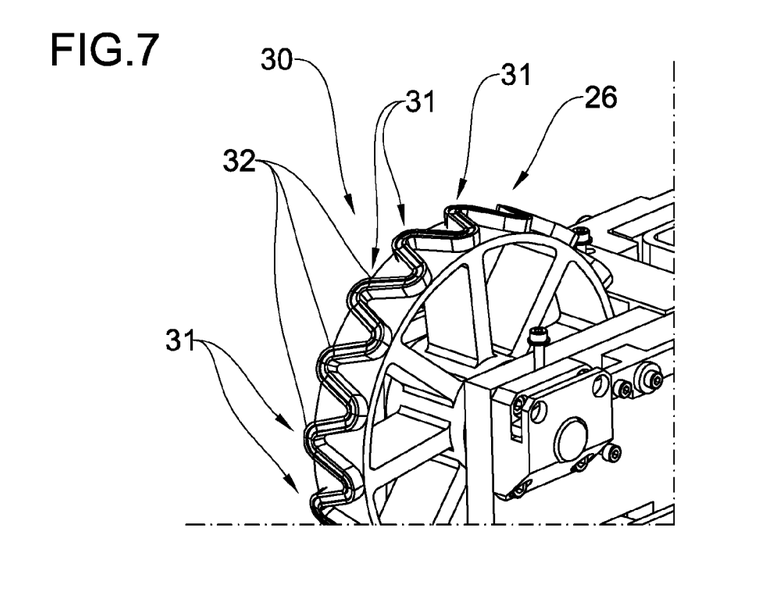
FIG. 7 illustrates a different embodiment of an element of the station of the apparatus in the preceding figures.

In the embodiment illustrated in FIG. 7, the movable surface 30 has a continuous and corrugated relief 31 with a substantially sinusoidal shape which extends along the entire radially peripheral surface of the wheel 26. The corrugated relief 31 has a constant thickness, measured along radial directions, and is provided with a central recess 32 also corrugated like the relief 31. In an embodiment, not illustrated, the relief can be shaped like a fret. In a different embodiment, shown in FIGS. 1 to 6, in place of a continuous relief, the movable surface 30 has a plurality of teeth 33 and the wheel 26 therefore resembles a cogwheel of a gear. Each of the teeth 33 develops, for example, along an axial direction (referred to the rotation axis of the wheel 26). Each of the teeth 33 has a central recess 32 which extends along the aforementioned axial direction and divides the tooth 33 into two halves. In variants not shown, the teeth 33 can also be inclined relative to the axial direction.

The wheel 26 and the raised elements are made, for example, of metal, for example made of steel, and in any case preferably of a stiffer material than the elastomeric material of the tyre being processed 2', so as to leave footprints and generate depressions in said tyre being processed 2'.

The application device 19 further comprises a supply device 34 (FIGS. 4 and 6) of a conductive liquid elastomeric compound configured for forming the conductive insert. The movable surface of the wheel 26 is configured for operatively coupling with the supply device 34 and receive therefrom the conductive liquid elastomeric compound and then transfer it onto the tyre being processed 2', as will be explained hereinafter.

Preferably, the conductive liquid elastomeric compound comprises at least one process oil, natural and/or synthetic rubber and conductive particles.

The supply device 34 comprises a tank 35 (visible in FIGS. 3, 4 and 6) for the conductive liquid elastomeric compound and an auxiliary wheel 36 rotating about a centre thereof and a rotation axis thereof, parallel to the rotation axis of the wheel 26, and having a peripheral edge 37 placed in contact with the movable surface of the wheel 26.

The auxiliary wheel 36 is mounted idly on an auxiliary pin 38 which is in turn housed in openings of a pair of auxiliary plates 39 of the auxiliary frame 24. The auxiliary plates 39 are mutually parallel and spaced apart and the auxiliary wheel 36 is located between the auxiliary plates 39. An auxiliary hook 40 is mounted on one of the auxiliary plates 27 and is configured for engaging one end of the auxiliary pin 38 projecting beyond the same plate 27. In particular, the auxiliary hook 38 is movable in rotation between a position of engagement with the end of the auxiliary pin 40 and a position of disengagement from the end of the auxiliary pin 40. When the auxiliary hook 38 is in the engaged position, the auxiliary pin 40 is axially anchored to the auxiliary plates 39. When the auxiliary hook 38 is in the disengaged position, the auxiliary pin 40 can be removed from the auxiliary plates 39 to remove and possibly replace the auxiliary wheel 36. The auxiliary pin 38 with the auxiliary hook 40 constitute an auxiliary quick release mechanism operatively coupled to the auxiliary wheel 36 and to the auxiliary support frame 24 for releasing or hooking the auxiliary wheel 36 to/from said auxiliary frame 24.

The auxiliary wheel 36 is located under the wheel 26 and its peripheral edge 37 is kept in contact with the movable surface of the wheel 26 by means of a spring 41 connected to the main frame 23 and to the auxiliary frame 24. In the illustrated embodiment, the auxiliary frame 24 is pivoted on the main frame 23 at a fulcrum 42 spaced from the pin 28 and the auxiliary pin 38 and also from the spring 41. The spring 41 is hooked to one of the plates 27 and to one of the auxiliary plates 39. The spring 41 pulls the auxiliary wheel 36, which can oscillate around the fulcrum 42, against the wheel 26.

The peripheral edge 37 of the auxiliary wheel 36 is partially immersed and in contact with the conductive liquid elastomeric compound contained in the tank 35. To this end, the tank 35 is placed under the auxiliary wheel 36 and is supported at one end of an auxiliary actuator 43 (FIGS. 1 and 3), for example comprising a pair of pneumatic cylinders, in turn supported by the main frame 23. The tank 35 is therefore carried by the main frame 23. The auxiliary actuator 43 is configured for moving the tank 35 away from or near the auxiliary wheel 36 so as to be able to adjust the distance and, for example, keep the auxiliary wheel 36 always partially immersed even when its dimensions vary, or to move the tank 35 together with the auxiliary wheel 36 and the wheel 26, or to move the auxiliary wheel 36 away from the wheel 26 and facilitate the replacement thereof for maintenance.

The peripheral edge 37 of the auxiliary wheel 36 is as rigid as the movable surface 30 of the wheel 26 and is, for example, metal. In embodiment variants, the peripheral edge 37 of the auxiliary wheel 36 may be more yielding than the movable surface 30. In embodiment variants, such peripheral edge 37 may be of absorbent material. The material of the peripheral edge 37 of the auxiliary wheel 36 is selected according to the amount of conductive liquid elastomeric compound to be transferred.

The supply device 34 comprises a recirculation circuit 44 (shown schematically in FIG. 3) operatively coupled to the tank 35, which has the function of keeping the conductive liquid elastomeric compound moving in order to make it homogeneous and avoid stagnation.

The tank 35 has its own wall provided with a spillway mouth 45 from which the excess conductive liquid elastomeric compound outflows. The tank 35 is housed within an outer tank 46 (FIG. 6) also supported at the end of the auxiliary actuator 43. The tank 35 is spaced from a base wall of the outer tank 46. In a lower portion of the outer tank 46, there is a drain 47 connected to a containment reservoir 48 and to a pump 49 through recirculation pipes 50. From the pump 49, the pipes 50 return to the tank 35. The pump 49 circulates the conductive liquid elastomeric compound from the tank 35 into the outer tank 46 through the spillway mouth 45, then into the reservoir 48 through the drain 47 and then back into the tank 35.

A scraper 51, schematically illustrated in FIG. 6, is operatively active on the peripheral edge 37 of the auxiliary wheel 36 to eliminate excess amounts of the conductive liquid elastomeric compound collected from the tank 35. For example, the scraper 51 is a plate mounted on the tank 35 itself and a distance regulator, preferably micrometric, is operatively associated with the scraper 51 to adjust a distance between one end of said plate and the peripheral edge 37.

A control unit preferably of an electronic type, not shown, is connected to the robotic arm 13, to the extruder 17, to the actuator 25, to the auxiliary actuator 43, to the pump 49 and is configured for managing the station 1 of the apparatus. In particular, the control unit is configured for controlling the delivery of the continuous elongated element 14 by the extruder 17, orienting the tyre being processed 2' and managing the rotation of said tyre being processed 2' through the robotic arm 13, adjusting a thrust of the wheel 26 on the tyre being processed 2' through the actuator 25, setting the position of the auxiliary wheel 36 with respect to the tank 35 by the auxiliary actuator 43, circulating the conductive liquid elastomeric compound through the pump 49.

In an embodiment not shown, an additional pump is provided below the tank 35. With a high viscosity of the liquid conductive compound, the pump 49 alone may indeed not be able to circulate the aforementioned compound.

In use and according to the process and method according to the invention, the robotic arm 13 carries the forming drum 12 and the belt structure 8, previously formed, above the application device 19 and in the vicinity of the deposition device 16. The robotic arm 13 orientates the forming drum 12 and the belt structure 8 so that the rotation axis "X-X" of the tyre being processed 2' delimits with a rotation axis of the wheel 26 (and of the auxiliary wheel 36) a non-zero angle function of an inclination of circumferential surfaces 52 of mutually coupled coils 15 to be deposited.

At this point, it is provided to deposit the tread band 9. To this end, the extruder 17 is brought close to the tyre being processed 2' and begins to deliver the continuous elongated element 14 made of elastomeric material while the tyre being processed 2' rotates around the rotation axis "X-X" thereof and the deposition wheel 18 presses a first contact area of said continuous elongated element 14 on the belt structure 8. In the illustrated embodiment, the deposition device 16 is located above the tyre being processed 2' in a position diametrically opposite to the application device 19.

Figure 2:
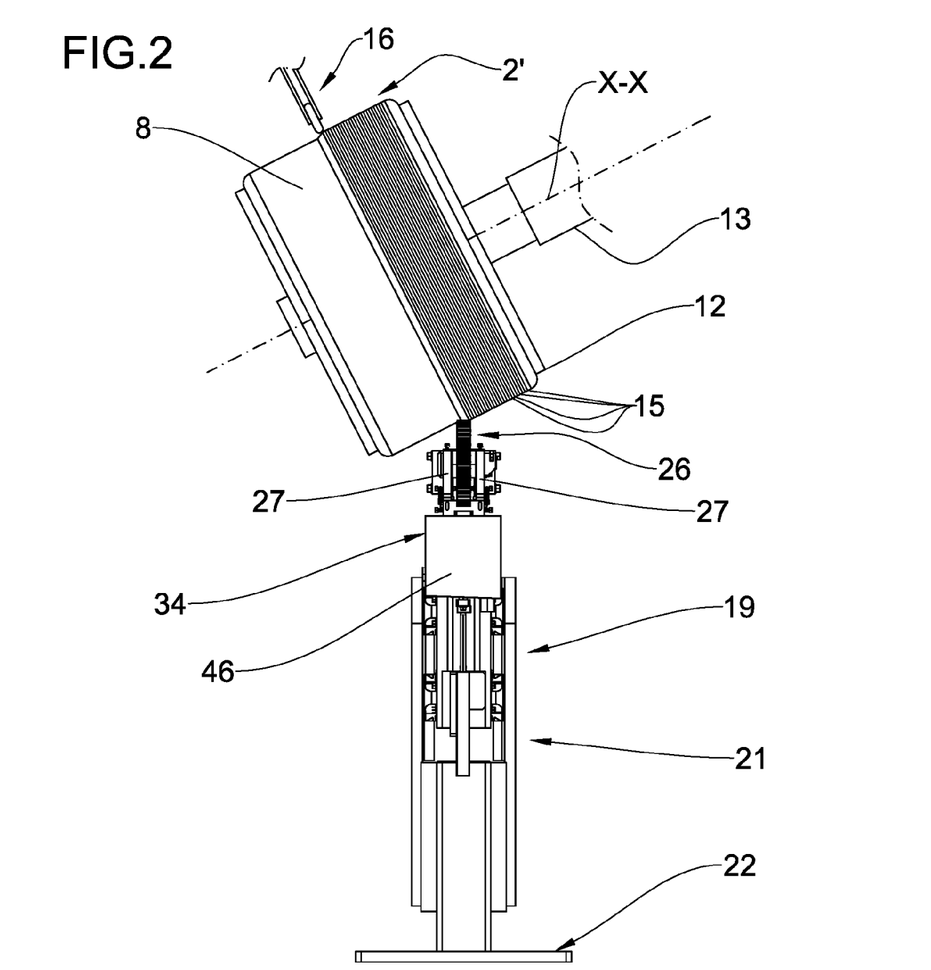
FIG. 2 illustrates a front view of the station of the apparatus in FIG. 1.
Figure 2A:
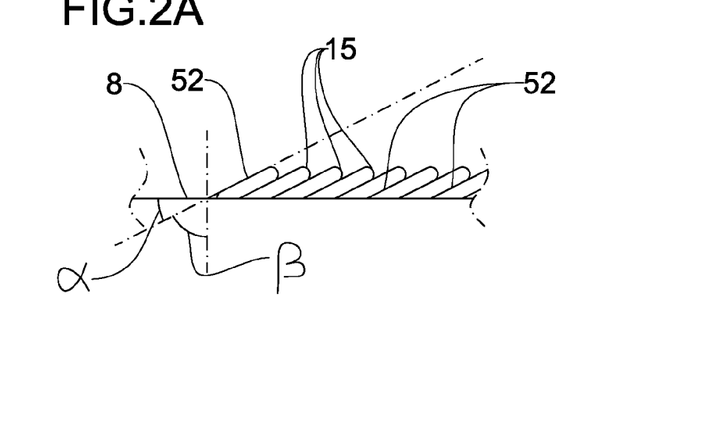
FIG. 2A illustrates a portion of a tyre being processed in the station in FIGS. 1 and 2.
Figure 3:
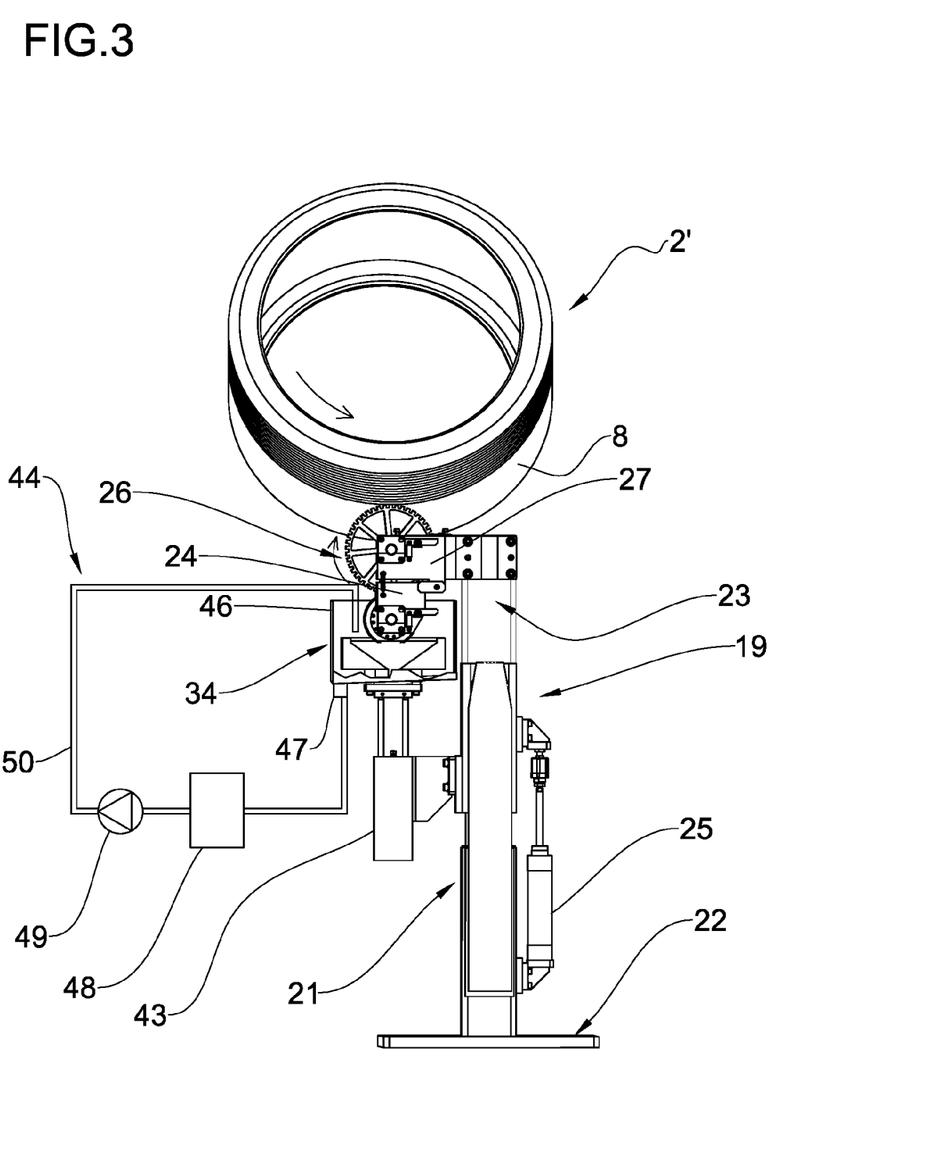
FIG. 3 is a lateral view of the apparatus in FIG. 1.
Figure 4:
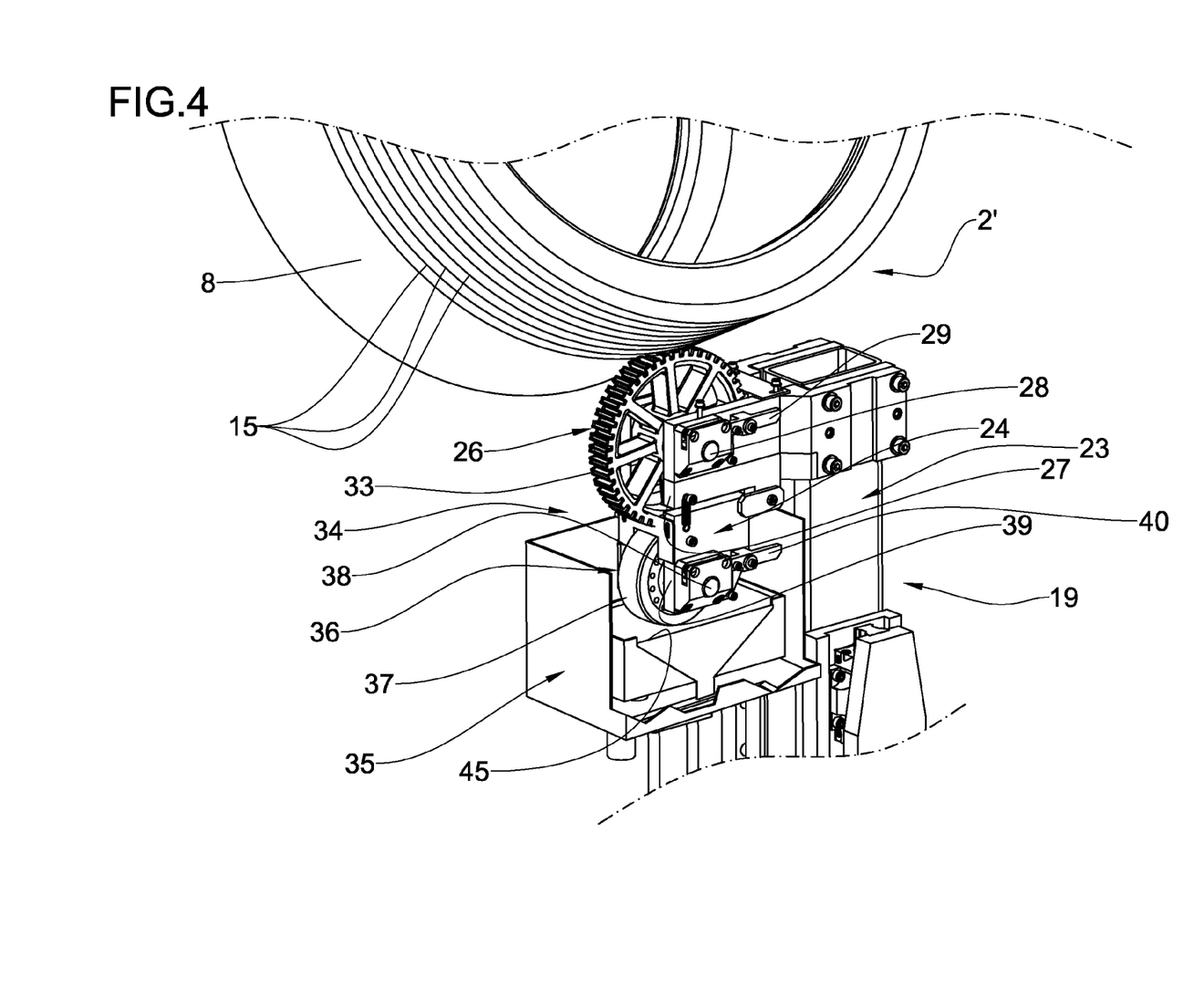
FIG. 4 shows a perspective portion of the station of the apparatus of the preceding figures with some parts removed to better highlight others.

As can be seen in FIG. 2A, the continuous elongated element 14 made of elastomeric material has a flattened cross section and is deposited by approaching and/or partially overlapping the coils 15. As a result, the coils 15 have the circumferential surfaces 52 mutually coupled and inclined with respect to a surface of the belt structure 8 on which they are deposited by an angle "α" preferably between 90° and 30°. This means that the complementary angle "β" (with respect to a right angle) between the same inclined circumferential surfaces 52 and the symmetry plane "M" of the tyre being processed 2' is between 0° and 60°.

In a first step, the deposition device 16 deposits a plurality of coils 15 up to about an axial half of the tyre being processed 2' so as to form an axial half of the tread band 9 while the application device 19 is inactive, i.e. the tyre being processed 2' is kept at a distance from the wheel 26. Once the first step has been completed, the deposition is interrupted and the rotation of the tyre being processed 2' is momentarily stopped. A circumferential surface 52 of a last coil 15 deposited and placed approximately at the symmetry plane "M" of the tyre being processed 2' remains visible, since it is not covered by the subsequent coil which must be subsequently deposited. The aforementioned circumferential surface 52 extends radially between a radially outer surface of the tread band 9 being formed and the surface of the belt structure 8.

Figure 5:
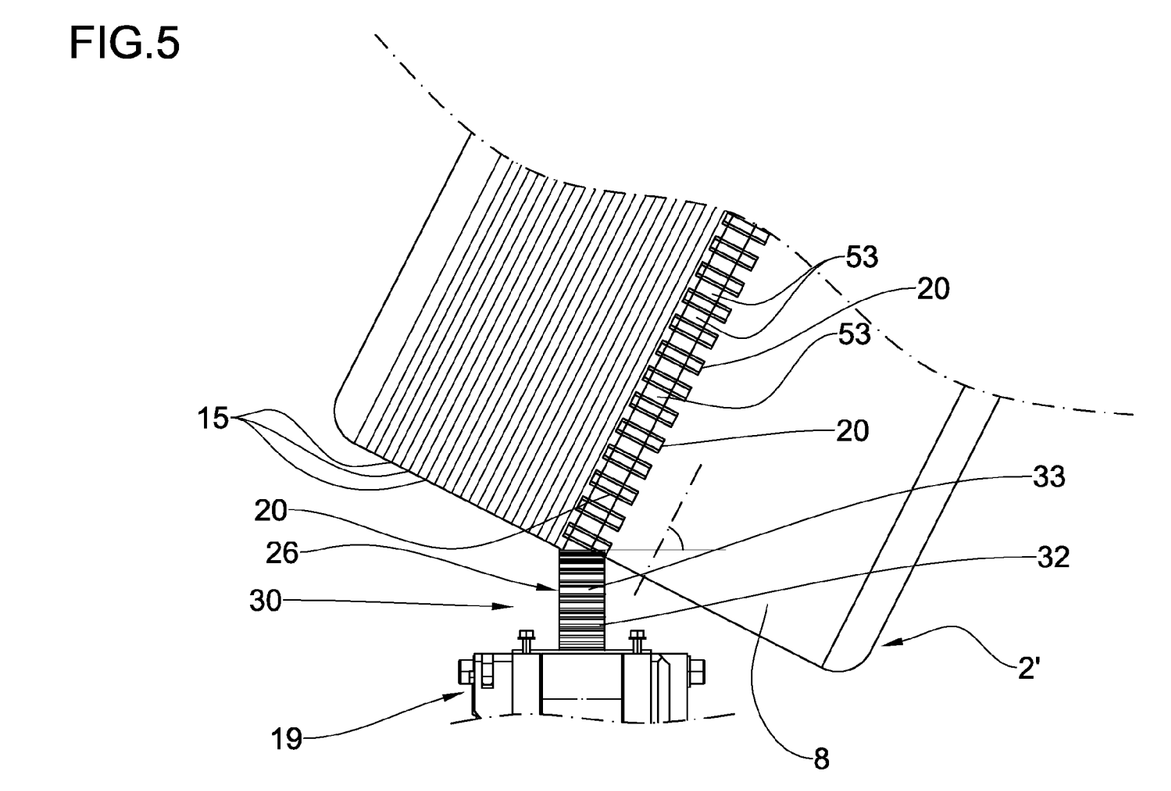
FIG. 5 shows an enlarged front view of the portion in FIG. 4.

The robotic arm 13 provides for tilting the tyre being processed 2' so that the circumferential surface 52 in view is substantially parallel to the movable surface 30 of the wheel 26 and for bringing said circumferential surface 52 in view in contact with the movable surface 30 of the wheel 26. The robotic arm 13 pushes the tyre being processed 2' against the wheel 26 in contrast to the action of the actuator 25, so that the wheel 26 exerts a pressure on the tyre being processed 2'. The tyre being processed 2' is again rotated making it perform at least one complete revolution around the rotation axis "X-X" thereof. The tyre being processed 2', while rotating, drives the wheel 26 in rotation, which in turn drives the auxiliary wheel 36 in rotation. The auxiliary wheel 36 draws the conductive liquid elastomeric compound from the tank 35 and transfers it to the wheel 26. The auxiliary wheel 36 doses a controlled amount of conductive liquid elastomeric compound through the use of the scraper 51, to the wheel 26. The wheel 26 in turn applies it to the visible circumferential surface 52 of the last wound coil 15 and to areas of the radially outer surface of the tread band 9 and of the belt structure 8 which are adjacent to said visible circumferential surface 52 (as shown in FIG. 5 and in FIG. 8).

The conductive liquid elastomeric compound which continuously extends between the radially outer surface of the tread band 9 and the radially outer surface of the belt structure 8 generates a plurality of electrically conductive paths 20 connecting said radially outer surface of the tread band 9 with said radially outer surface of the belt structure 8. To this end, the movable surface 30 has an axial width greater than a width of the visible circumferential surface 52 of the coil 15.

Once the tyre 2 has been built and vulcanised, the radially outer surface of the tread band 9 on which the conductive elastomeric compound is present is located in a footprint area of the tyre 2, so that static electricity is discharged to the ground.

The geometry of the radially peripheral surface of the wheel 26, in particular of the relief elements and/or of the recesses of the movable surface 30, determines the pattern or design according to which the conductive liquid elastomeric compound is deposited on the tyre being processed 2'.

Figure 8:
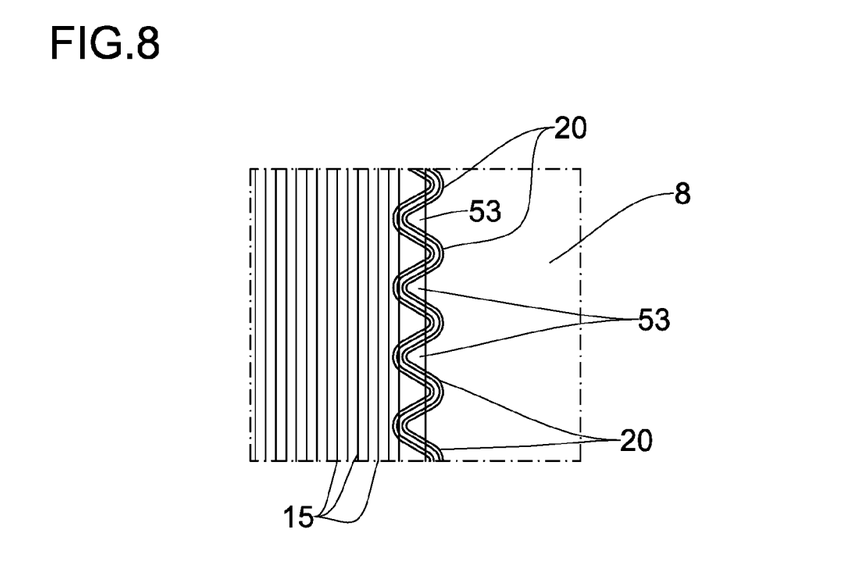
FIG. 8 is a view of a surface of a tyre being processed in the station provided with the element in FIG. 7.

The continuous and corrugated relief 31 with substantially sinusoidal pattern of the wheel 26 in FIG. 7 generates on the tyre being processed 2' a wavy pattern consisting of the conductive liquid elastomeric compound, as illustrated in FIG. 8, in which peaks and valleys of said design lie respectively on the radially outer surface of the tread band 9 and on the radially outer surface of the belt structure 8.

The teeth 33 of the wheel in FIGS. 1 to 5 generate on the tyre being processed 2' a plurality of discrete portions which follow each other along the circumferential development of the tyre being processed 2', as illustrated in FIG. 5.

In any case, the conductive liquid elastomeric compound delimits on the coil 15 zones 53 without the compound itself and configured for being directly joined with a subsequent axially approached coil. In other words, the design defined by the compound serves to obtain the electrical conductivity while the free zones 53, not covered by the compound, allow the coil 15 subsequently deposited to adhere firmly to the already deposited coil 15 and to give continuity to the tread band 9. For example, the free zones 53 without liquid elastomeric compound have a circumferential extension ranging from a few millimetres to a few centimetres, preferably from about 5 mm to about 5 cm.

The rough lateral surfaces of the raised elements of the movable surface 30 contribute to avoiding completely wetting the surface of the tyre being processed 2' and therefore allow the formation of the free zones 53. The pressure exerted by the wheel 26 on the tyre being processed 2' not yet vulcanised generates depressions in the tyre being processed 2' which are filled with said conductive liquid elastomeric compound. The depressions allow imparting a certain thickness to the conductive liquid elastomeric compound which fills them and also delimiting the surface wetted by said compound.

Once the application of the conductive liquid elastomeric compound is completed, the robotic arm 13 moves the tyre being processed away from the wheel 26 and the deposition device 16 resumes the winding of the continuous elongated element 14.

The deposition of the tread band 9 therefore takes place in two steps. When the first step is completed, in which about one axial half of the tread band 9 is deposited, the conductive liquid elastomeric compound is applied and then, in a second step, a second axial half of the tread band 9 is deposited.

Once the deposition is complete, only a part of the design defined by the conductive liquid elastomeric compound lies on the radially outer surface of the tread band 9 and comes into contact with the ground when the tyre is mounted on a vehicle.

In a variant of the process according to the invention, it is provided to apply the conductive liquid elastomeric compound simultaneously with the winding of the continuous elongated element 14, i.e. without interrupting the deposition of the tread band 9. The continuous elongated element 14 is deposited by the deposition device 16 at a first point along the circumferential development of the tyre being processed 2' and the conductive liquid elastomeric compound is applied by the application device 19 at a second point different from the first point along said circumferential development. The first point and the second point are positioned at diametrically opposed areas of the tyre being processed 2', for example as illustrated in FIGS. 1 and 2. According to this variant, the deposition device 16 works continuously by depositing all the coils of the tread band 9 while the wheel 26 is brought into contact with an intermediate coils 15 just after the deposition of the latter and preferably by a single revolution of the tyre being processed 2'.

Once the tread band 9 has been deposited and the green tyre has been built, the green tyre is vulcanised and the conductive liquid elastomeric compound also vulcanises and becomes an integral part of the tread band 9.

In the embodiment described and illustrated, the wheel 26 and the auxiliary wheel 36 are idle. In embodiment variants, not shown, the wheel 26 and/or the auxiliary wheel 36 can be motorised. For example, one of the two wheels 26, 36 is connected to a respective motor and the wheel 26 and the auxiliary wheel 36 are connected to one another by a transmission, for example by a pair of gears.

Experimental Test

A tyre obtained with the process and the apparatus described above was subjected to a test to evaluate the electrical resistance/conductivity according to WDK110 Standard (Blatt 1)—August 2001.

The dry tyre mounted on a steel rim was inflated (Table 1) and placed perpendicularly against a smooth, flat surface of a conductive metal plate supported by an insulating base. Direct current was applied between the rim and the conductive metal plate and the static electrical resistance measurement of the tyre was performed.

TABLE 1

| tyre 225/45R19 | |
|---|---|
| Inflation pressure [KPa] | 230 |
| Load [Kg] | 568 |
| Room temperature [° C.] | 23 |
| Ambient humidity [% RH] | 47 |

The tyre was subjected to three measures, each of which was performed for a period of 20 seconds. The values shown in the following Table 2 are those measured after 180 seconds of application of the voltage.

TABLE 2

| | Applied voltage [V] | Resistance [Ohm] |
|---|---|---|
| Measure 1 | 960 | $1.28 \times 10^6$ |
| Measure 2 | 965 | $1.46 \times 10^6$ |
| Measure 3 | 932 | $7.45 \times 10^5$ |

The reference value below which the test is passed is $1 \times 10^{10}$ Ohm (reference value for tyres for "general use"); it should be considered that a tyre identical to that tested without the aforementioned conductive elastomeric compound is substantially an insulator.

As can be seen, all three tests were successful.

The invention claimed is:

1. An application device configured for applying a conductive insert on a tyre being processed, wherein said application device comprises:
    a supply device for supplying a conductive liquid elastomeric compound; and
    an applicator having a movable surface configured for being operatively coupled with the supply device and receiving the conductive liquid elastomeric compound;
wherein:
    the movable surface is configured for being placed in contact with a tyre being processed while said tyre is placed in rotation and for applying the conductive liquid elastomeric compound on at least one coil of a plurality of coils that are axially adjacent and/or partially superimposed;

the applicator is configured to:
 a) generate depressions in the tyre in a pattern defined by elements in relief; and
 b) fill the depressions in the tyre with said conductive liquid elastomeric compound thereby covering said elements as the depressions in the tyre are generated;
the supply device comprises:
 an auxiliary wheel rotatable around a centre thereof and having a peripheral edge placed in contact with the movable surface; and
 a tank for the conductive liquid elastomeric compound; and
the peripheral edge of the auxiliary wheel is partially in contact with the conductive liquid elastomeric compound contained in the tank.

2. The application device as claimed in claim 1, wherein the movable surface has a design defined by elements in relief and/or by recesses.

3. The application device as claimed in claim 1, wherein the applicator comprises a wheel rotatable around a centre thereof, wherein the movable surface is a radially peripheral surface of said wheel.

4. The application device as claimed in claim 3, wherein the application device further comprises at least one spring operating between the wheel and the auxiliary wheel in order to retain the peripheral edge against the movable surface.

5. The application device as claimed in claim 3,
wherein the applicator is mounted on a support frame; and
wherein the applicator comprises a quick release mechanism operatively coupled to the wheel and to the support frame, in order to release the wheel from said support frame or couple the wheel to said support frame.

6. The application device as claimed in claim 5,
wherein the supply device is mounted on the support frame;
wherein the supply device comprises an auxiliary quick release mechanism operatively coupled to the auxiliary wheel and to an auxiliary frame, in order to release the auxiliary wheel from said auxiliary frame or couple the auxiliary wheel to said auxiliary frame.

7. The application device as claimed in claim 1, comprising:
a support frame provided with a base and with a main frame, wherein the main frame carries the applicator;
an actuator operatively interposed between the base and the main frame in order to move said main frame; and
a control unit connected to the actuator and configured for regulating a thrust of the applicator on the tyre being processed.

8. The application device as claimed in claim 1, wherein the movable surface has a plurality of teeth.

9. The application device as claimed in claim 1, wherein the movable surface has an undulated relief.

10. The application device as claimed in claim 1, wherein the movable surface has an axial width greater than a width of a visible circumferential surface of the at least one coil.

11. The application device as claimed in claim 1, wherein the movable surface is more rigid than the tyre being processed.

12. The application device as claimed in claim 1, wherein the supply device comprises a recirculation circuit operatively coupled to the tank.

13. The application device as claimed in claim 1, wherein the supply device further comprises at least one scraper operatively active on the peripheral edge of the auxiliary wheel in order to eliminate excess quantities of the conductive liquid elastomeric compound.

14. The application device as claimed in claim 1, wherein the peripheral edge of the auxiliary wheel is as rigid as the movable surface or more yielding than the movable surface.

15. An apparatus for building tyres for vehicle wheels, comprising:
a motorized forming drum configured for supporting and rotating a tyre being processed around a rotation axis thereof;
a deposition device configured for winding a continuous elongated element made of elastomeric material according to a plurality of coils that are axially adjacent and/or partially superimposed in radially outer position on a belt structure of the tyre being processed; and
an application device comprising:
 a supply device for supplying a conductive liquid elastomeric compound; and
 an applicator having a movable surface operatively coupled with the supply device and receiving the conductive liquid elastomeric compound;
wherein the movable surface is configured for being placed in contact with the tyre being processed while said tyre is placed in rotation and for applying the conductive liquid elastomeric compound on at least one coil of the plurality of coils that are axially adjacent and/or partially superimposed;
wherein the applicator is configured to:
 a) generate depressions in the tyre in a pattern defined by elements in relief; and
 b) fill the depressions in the tyre with said conductive liquid elastomeric compound covering said elements in relief as the depressions in the tyre are generated;
wherein the supply device comprises:
 an auxiliary wheel rotatable around a centre thereof and having a peripheral edge placed in contact with the movable surface, and
 a tank for the conductive liquid elastomeric compound; and
wherein the peripheral edge of the auxiliary wheel is partially in contact with the conductive liquid elastomeric compound contained in the tank.

16. The apparatus as claimed in claim 15, wherein the applicator comprises a wheel rotatable around a centre thereof, wherein the movable surface is a radially peripheral surface of said wheel.

17. The apparatus as claimed in claim 15, wherein the movable surface has a design defined by elements in relief and/or by recesses.

18. The apparatus as claimed in claim 15, wherein the application device further comprises:
a support frame provided with a base and with a main frame; wherein the main frame carries the applicator;
an actuator operatively interposed between the base and the main frame in order to move said main frame; and
a control unit connected to the actuator and configured for regulating a thrust of the applicator on the tyre being processed.

19. An apparatus for building tyres for vehicle wheels, comprising:
a motorized forming drum configured for supporting and rotating a tyre being processed around a rotation axis thereof;
a deposition device configured for winding a continuous elongated element made of elastomeric material according to a plurality of coils that are axially adjacent and/or partially superimposed in radially outer position on a belt structure of the tyre being processed; and an application device comprising:
- a supply device for supplying a conductive liquid elastomeric compound; and
- an applicator having a movable surface operatively coupled with the supply device and receiving the conductive liquid elastomeric compound;

wherein:
- the movable surface is configured for being placed in contact with the tyre being processed while said tyre is placed in rotation and while the deposition device winds the continuous elongated element in coils such that the movable surface applies the conductive liquid elastomeric compound on at least one coil of the plurality of coils that are axially adjacent and/or partially superimposed; and
- the applicator is configured to:
  - a) generate depressions in the tyre in a pattern defined by elements in relief; and
  - b) fill the depressions in the tyre with said conductive liquid elastomeric compound covering said elements in relief as the depressions in the tyre are generated.

20. The apparatus as claimed in claim 19, wherein the applicator comprises a wheel rotatable around a centre thereof, wherein the movable surface is a radially peripheral surface of said wheel.

* * * * *